United States Patent
Pulugurtha et al.

(10) Patent No.: US 12,142,429 B1
(45) Date of Patent: Nov. 12, 2024

(54) SYSTEMS AND METHODS FOR PATTERNING VALVE METALS

(71) Applicants: Markondeyaraj Pulugurtha, Miami, FL (US); Arvind Agarwal, Miami, FL (US); Cheng Zhang, Miami, FL (US); Reshmi Banerjee, Miami, FL (US); Denny John, Miami, FL (US)

(72) Inventors: Markondeyaraj Pulugurtha, Miami, FL (US); Arvind Agarwal, Miami, FL (US); Cheng Zhang, Miami, FL (US); Reshmi Banerjee, Miami, FL (US); Denny John, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/616,828

(22) Filed: Mar. 26, 2024

(51) Int. Cl.
| | |
|---|---|
| H01G 13/00 | (2013.01) |
| H01G 4/008 | (2006.01) |
| H01G 4/04 | (2006.01) |
| H01G 4/224 | (2006.01) |
| H01G 4/228 | (2006.01) |

(52) U.S. Cl.
CPC .......... *H01G 13/003* (2013.01); *H01G 4/008* (2013.01); *H01G 4/04* (2013.01); *H01G 4/224* (2013.01); *H01G 4/228* (2013.01); *H01G 13/006* (2013.01)

(58) Field of Classification Search
CPC ........ H01G 13/003; H01G 4/008; H01G 4/04; H01G 4/224; H01G 4/228; H01G 13/006
See application file for complete search history.

(56) References Cited

U.S. PATENT DOCUMENTS

| 8,310,817 B2* | 11/2012 | Kobayashi | H01G 9/15 29/25.03 |
| 2003/0026063 A1* | 2/2003 | Munshi | H01G 11/56 361/503 |
| 2008/0068780 A1* | 3/2008 | Shioga | H01G 4/236 29/25.03 |
| 2011/0222209 A1* | 9/2011 | Ohyama | H01G 9/0525 361/523 |

(Continued)

FOREIGN PATENT DOCUMENTS

| CN | 103560015 A | * | 2/2014 |
| JP | 2006302917 A | * | 11/2006 |

(Continued)

OTHER PUBLICATIONS

Banerjee et al., Cold-sprayed aluminum capacitors on leadframes for 3D power packaging, 2023 Fourth International Symposium on 3D Power Electronics Integration and Manufacturing (3D-PEIM) (Year: 2023).*

*Primary Examiner* — Jeffrey T Carley
*Assistant Examiner* — Jose K Abraham
(74) *Attorney, Agent, or Firm* — SALIWANCHIK, LLOYD & EISENSCHENK

(57) ABSTRACT

Cold-sprayed aluminum capacitors on lead frame metal foils are provided for applications in 3D power package integration. This additive manufacturing process allows pre-patterned low-temperature processing of aluminum electrodes on metal lead frames, insulated metal substrates or even heat-spreaders and cold-plates. Cold-sprayed capacitors can eliminate several process integration and reliability issues that are associated with traditional discrete surface-assembled capacitors.

10 Claims, 7 Drawing Sheets

Routing to leadframe (e.g., copper leadframe), heat-spreader, bus bar, and/or other components

(56) References Cited

U.S. PATENT DOCUMENTS

| | | | |
|---|---|---|---|
| 2011/0222210 A1* | 9/2011 | Fujiwara | H01G 9/07 361/540 |
| 2012/0099242 A1* | 4/2012 | Ohyama | |
| 2022/0344102 A1* | 10/2022 | Tamatani | H01G 9/045 |

FOREIGN PATENT DOCUMENTS

| | | | |
|---|---|---|---|
| JP | 2008021761 A | * | 1/2008 |
| JP | WO2023054059 | * | 4/2023 |
| WO | WO-2023238681 A1 | * | 12/2023 |
| WO | WO-2024070531 A1 | * | 4/2024 |

* cited by examiner

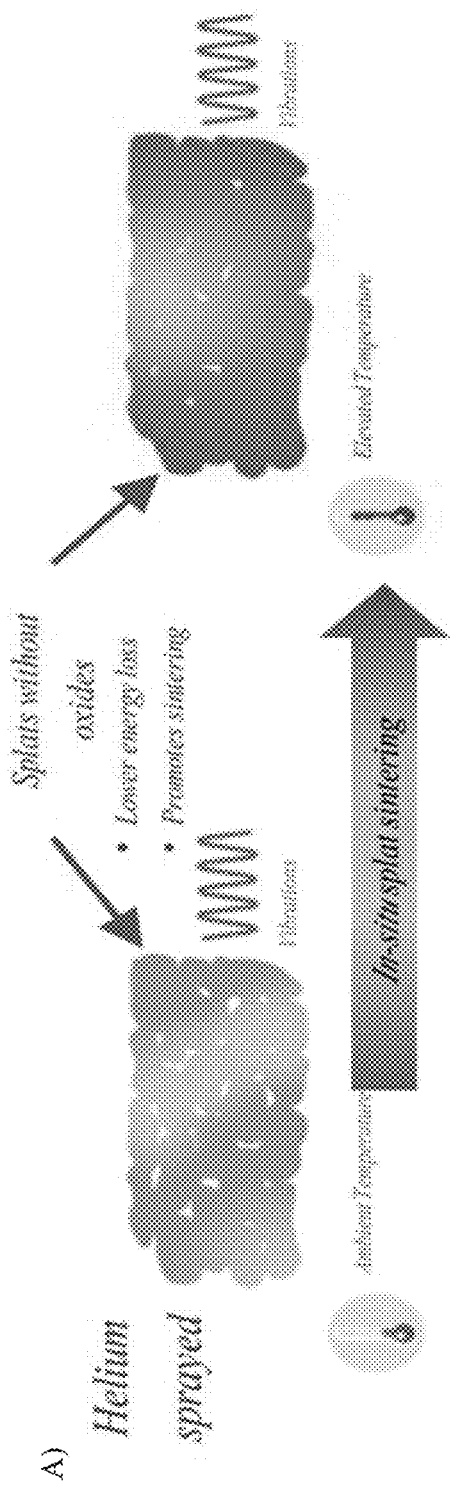
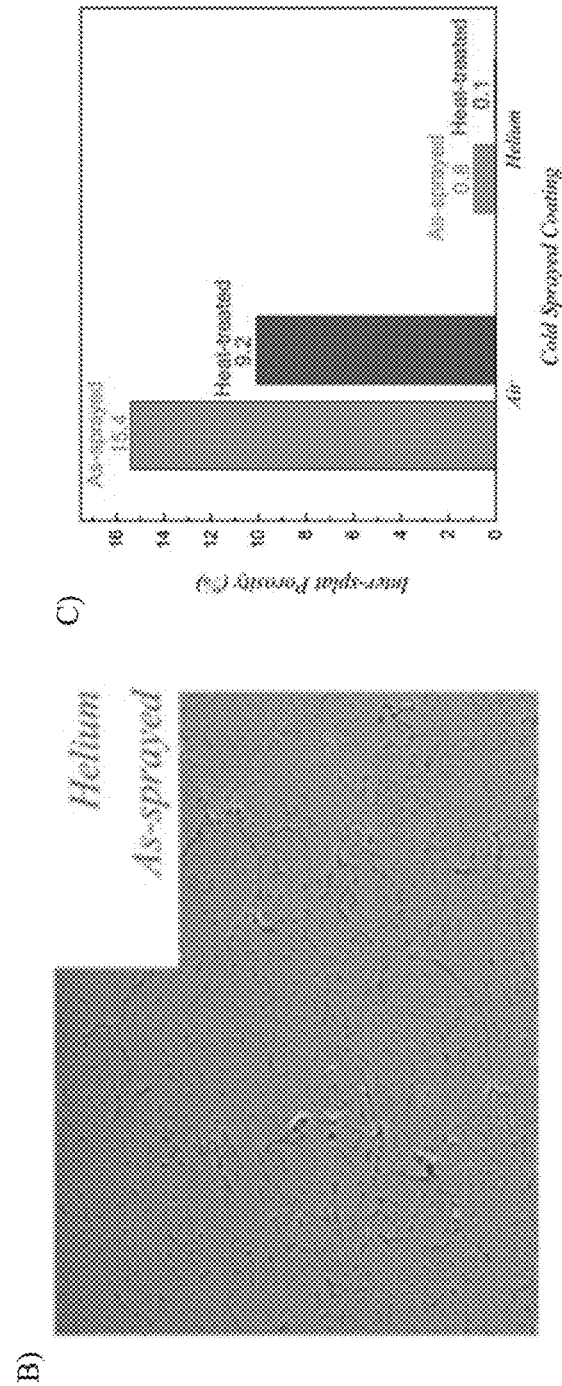
FIGS. 2A-2C

SYSTEMS AND METHODS FOR PATTERNING VALVE METALS

BACKGROUND

Capacitors are a $20-30 billion industry and play a critical role in the future performance of computing, Internet of Things, and communication systems. Lack of sufficient availability of high-capacitance-density capacitors can limit the performance of power modules in related art technology. Related art approaches of manufacturing power modules with the assembly of low-volumetric-capacitance-density capacitors create major fundamental system integration limitations in reaching high power densities and efficiencies, and can result in large electrical impedances between the loads, switches and drivers.

Today's approach of manufacturing power electronics with the assembly of pre-packaged devices and low-volumetric capacitance-density capacitors and inductors create major fundamental system integration limitations in reaching high power densities and efficiencies. This approach also results in large electrical impedances between the switches and drivers, along with high thermal impedances between the switches and the heat-spreaders and reliability concerns. Passive components will continue to limit the benefits from the massive R&D investments in power module advances such as wide bandgap devices, die embedding with planar interconnects, integrated gate drivers and controllers, and integrated 3D cooling. The power passive components industry will, therefore, have to through dramatic changes in the next few years [2]. A key challenge to be addressed is ensuring long-term reliability in a high electric field, high-temperature and moisture environment for an extended period, given the need for high permittivity and voltage to meet the capacitor needs [3]. Similarly, low losses with high-frequency and current-handling are the key for magnetics. There is a critical need to bring major paradigm changes in passive component and 3D power packaging industry with disruptive technologies that still build on the vast know-how and prior knowledge that the industry has already developed. With this goal in mind, we seek to create a new class of passive component technologies that systematically build on the industry's strengths but overcome the fundamental barriers with breakthrough technical solutions.

BRIEF SUMMARY

Embodiments of the subject invention provide novel and advantageous systems and methods to pattern valve metals on package-compatible foils (e.g., copper foils). Valve metals commonly include aluminum, titanium, tantalum, and niobium. They have a common characteristic of forming a natural and native oxide that is highly insulating in nature. Valve metals can also include tungsten, chromium, zirconium, hafnium, zinc, vanadium, bismuth, or antimony. Copper foils are directly compatible with package integration and can be easily integrated into standard packaging architectures. Embodiments provide embedded capacitors for next-generation power deliver networks, power converters, and integrated power modules. Embodiments provide major benefits for integration, capacitance-density, and efficiency. Embodiments provide capacitance density equal to or greater than 10 microFarads per cubic centimeter ($\mu$f/cc) for 400 Volt (V) capacitors, and equal to or greater than 500 $\mu$f/cc for 48 V capacitors.

Capacitors that are integrated far from the load increase the response time, lower the noise-suppression performance, and inhibit miniaturization. On-chip capacitors address this barrier but have inadequate capacitance-densities. Embodiments of the subject invention advantageously provide high-capacitance-density tantalum or aluminum nanocapacitors that are integrated into laminate, flex, or silicon interposers with a unique combination of additive manufacturing and packaging processes. Embodiments advantageously provide one or more of: (a) Additively-deposited tantalum and aluminum nanoparticles on copper foils for 3D integration of high-surface-area electrodes that have 5× more surface area compared to related art technologies; (b) Anodization and conducting polymer cathodes providing reduced cost; and (c) Three dimensional (3D) vertical integration of capacitor integrated passive devices (IPDs) with active devices.

Valve metal capacitors of aluminum and tantalum on copper carriers provide key advantages and impact the whole capacitor industry. Related art Al and Ta capacitors provide support for a $15 billion industry, but related art technologies are limited because of several reasons, including that they are too thick, do not perform well at high frequencies, and are expensive. Additive manufacturing of porous tantalum and aluminum on copper foils according to certain embodiments of the subject invention can address these limitations because capacitive devices can be scaled down to thinner films and can be fabricated in large quantity at low cost using area-array fabrication. They can be optimally designed to any flexible footprint arrays based on the load requirements.

Embodiments provide structures and methods to form high-capacitance-density tantalum and aluminum porous electrodes on copper foils. Embodiments can advantageously provide cold-sprayed aluminum and tantalum particle electrodes on copper carriers for low-cost high-surface-area electrodes, anodization to form dielectrics, and/or deposition of counter electrodes.

In certain embodiments anodization is performed in phosphoric acids at bias voltage of 4-12 V with a ramp rate of 0.1 V/s and dwell-times of 15-30 minutes depending upon the thickness. Counter electrodes can be deposited with dip-coated conducting polymers or Atomic Layer Deposition of TiN according to certain embodiments. This approach can result in high volumetric-capacitance-densities, thinner profiles, and easier package integration.

Embodiments provide a new manufacturing paradigm for capacitors. By depositing and patterning high surface area Ta and Al electrodes on thin copper foils and directly integrating them in packaging substrates, embodiments can address fundamental limitations in capacitance-density and performance of related art technologies. Embodiments can provide miniaturized capacitors with thinner form-factors and lower fabrication cost compared to related art systems and methods.

BRIEF DESCRIPTION OF DRAWINGS

FIGS. 2A-2C illustrate a cold-sprayed aluminum process study comparing inter-splat porosity achieved according to an air-sprayed embodiment of the subject invention against that achieved by a related art helium sprayed process.

high magnification view of the cross section optical microstructure, and (FIG. 3C) SEM micrograph of top section of the cold sprayed aluminum.

Figure 4:
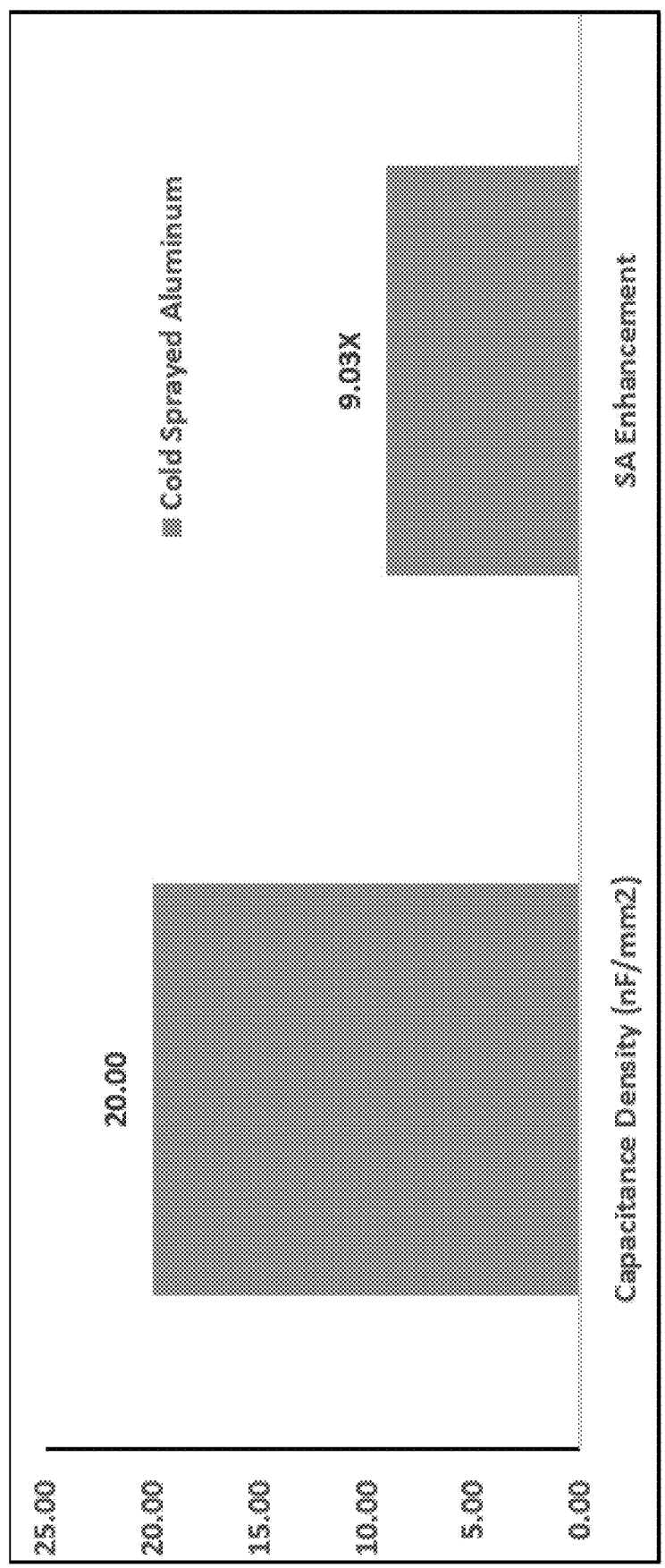

FIG. 4 is a chart showing capacitance increase and surface area enhancement with cold-sprayed aluminum according to an embodiment of the subject invention, benchmarked as a percentage relative to planar devices.

Figure 5:
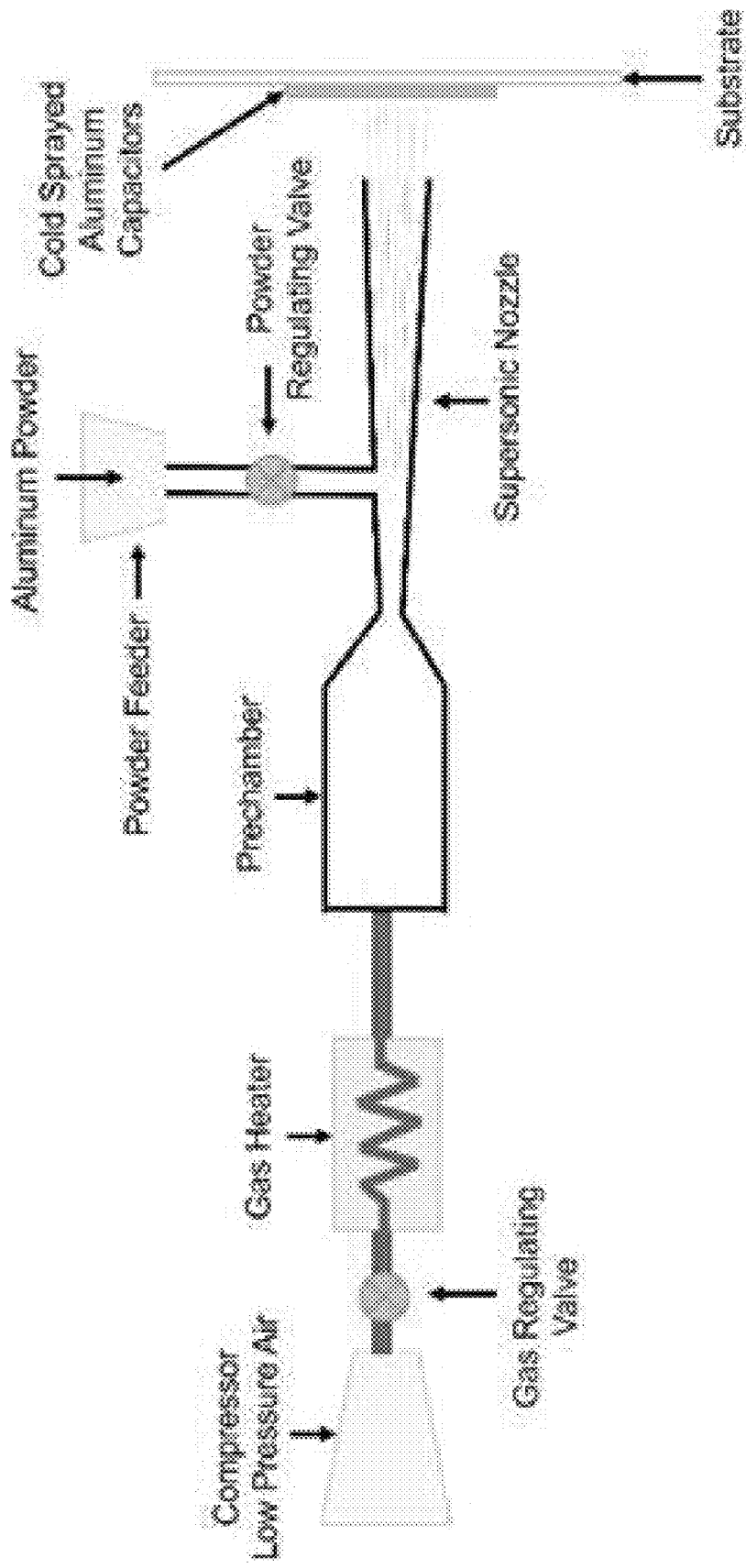

FIG. 5 is a schematic illustration of a low pressure cold-spray deposition process according to an embodiment of the subject invention.

DETAILED DESCRIPTION

Embodiments of the subject invention provide integrated high-capacitance-density capacitors with high-voltage and high-temperature reliability. In certain embodiments the provided planar structure allows easy integration of thermal management and other encapsulation for enhanced reliability. Embodiments advantageously provide high surface area electrodes with porous electrodes, conformal dielectrics, and counter electrodes. Compared to related art multilayered electrodes that only provide linear scaling in capacitance-density with thickness, porous electrodes provide nonlinear increment in surface area or capacitance-density with increasing thickness. In related art technologies, reliable high surface area electrodes are achieved with etched aluminum foils and sintered tantalum electrodes, both of which have process limitations in power module integration.

Embodiments address this key barrier with cold-sprayed aluminum particles, followed by anodization. The provided valve metal electrodes were developed through an in-house cold-spray process according to an embodiment of the subject invention. This approach has several advantages as it eliminates the need for post-patterning the high surface area electrodes and allows direct integration of the aluminum electrodes on copper lead frames, bus bars, and heat-spreaders. Most importantly, it eliminates the sintering issues of electrodes. Sintering refractory metals requires temperatures that typically exceed 1500° C. under high-vacuum conditions. Similarly, aluminum electrodes are created as electrochemically etched foils, which also limits their process integration. Cold-spray processing according to certain embodiments of the subject invention provides selective deposition of the porous aluminum in a direct-patterned format without the need for post-patterning. Embodiments of the subject invention provide passive components with novel cold-sprayed aluminum architectures co-packaged with actives using copper-like low-stress heat-spreaders.

Embodiments of the process begin with copper or aluminum metal foils. These are widely used in analog and power device packaging as lead frames to provide wiring when they are etched into patterns and also to cool the chip from the back side. On these foils, patterns of porous aluminum are cold-sprayed. The cold-spray nozzle head is fed with powder and inert gas to achieve high velocities. Embodiments provide additive manufacturing with cold-spray having unique advantages to achieve the porous structures. First, the aluminum electrode patterns can be additively printed. Because the process does not need any etching process to achieve porosity, there is no need to micropattern the porous electrode domains. Secondly, porosity with controlled parameters can be achieved during the deposition by changing the process parameters during printing. For example, highly-open porous regions can be achieved in the top and lower porosity can be maintained in the bottom electrode regions. In certain embodiments the porosity can be engineered to achieve good coatings over the counter electrodes.

In certain embodiments the process advantageously provides a careful selection and control of several parameters such as gas type, gas pressure, gas temperature, and particle velocity. These parameters control the splat dynamics through the mechanical deformation, interlocking, and solid-state diffusion to provide adequate metallurgical bonding between the particles. A schematic illustration of the process is shown in FIGS. 2A-2C. Cold-spray process has been shown to achieve dense pore-free aluminum. One challenge here is to induce controlled open-porosity. In certain embodiments this can be achieved with lowering the particle velocity and powder density. By controlling these parameters, open porosity has been achieved for high surface area electrodes. A commercial cold-spray tool was used at a speed of Mach<1 (e.g., less than 343 meters per second (m/s)) for achieving the initial porous aluminum structures as shown in FIGS. 3A-3C.

The next step is to contain the porous electrodes in dielectric dams. The dams are made of screen-printed flexible high-temperature polymers such as polyimide, polynorbornene, high-temperature polyurethane and similar thermoplastic polymers for high strength and toughness. During printing, the polymer flows and surrounds the porous electrodes with controlled surface encapsulation.

The next step is to anodize the films to form an oxide. This is performed with a weak acid. Candidates include polyethylene glycol or ammonium pentaborate. Anodization is performed by slowly ramping the voltage to achieve the target dielectric thickness. Initial proof-of-concept samples are anodized at 30 V to form high-voltage dielectrics. Anodization was performed in standard ammonium pentaborate electrolytes at 30 V with a ramp rate of 0.1 V/s and a final dwell time of 30 minutes. Counter electrodes were formed in certain embodiments by drop-casting PEDOT-PSS conducting polymer suspensions, followed by baking. Silver composites were used to form the current collectors for counter electrodes.

Figures 1A, 1B, 1C, 1D:
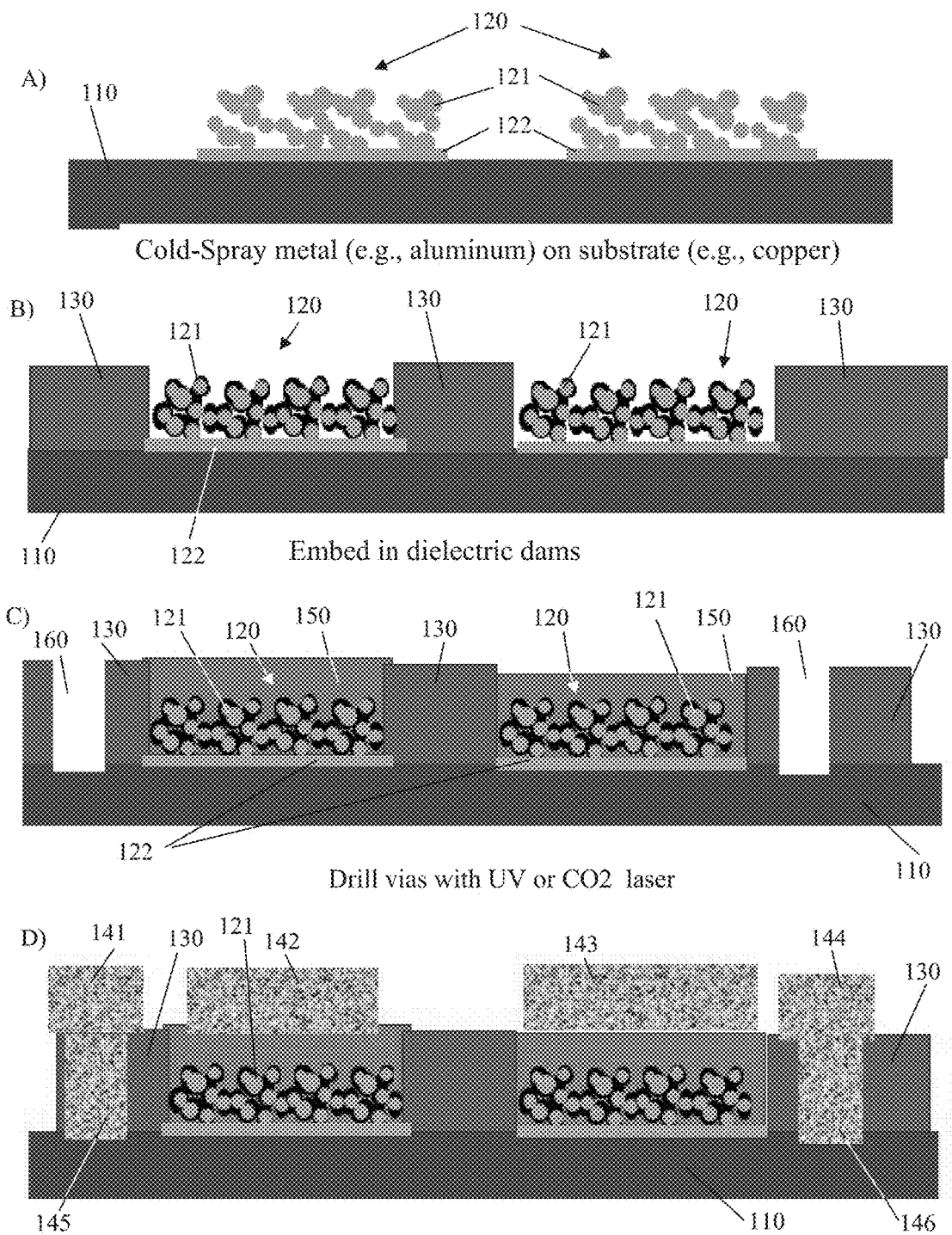
FIGS. 1A-1D are schematic illustrations of cold-sprayed valve metals on lead-frame, according to an embodiment of the subject invention.
Figure 3A:
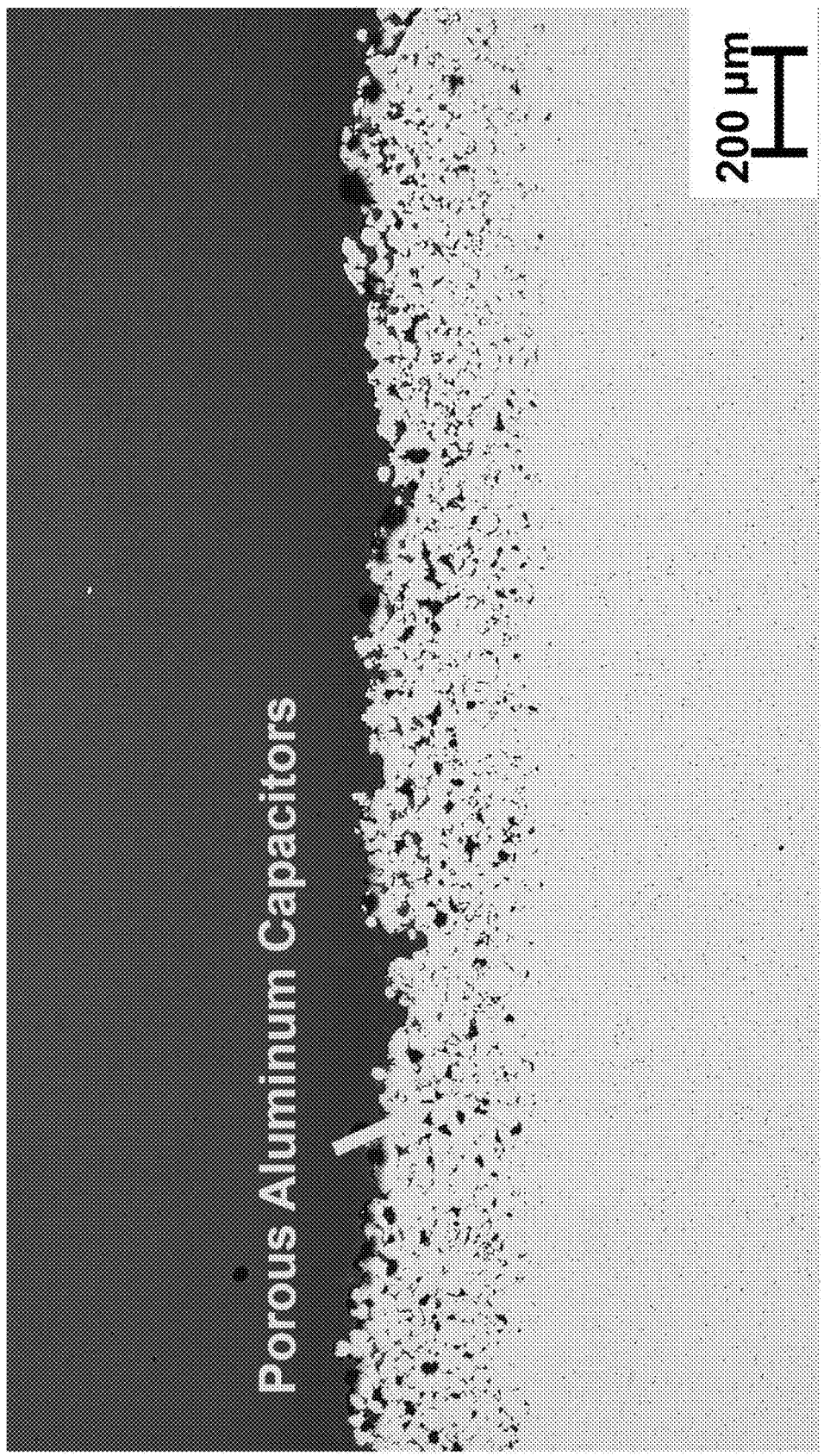
FIGS. 3A-3C illustrate surface morphology of cold-sprayed porous aluminum according to an embodiment of the subject invention, including (FIG. 3A) cross section optical microstructure of the porous aluminum, (FIG. 3B)
Figure 3B:
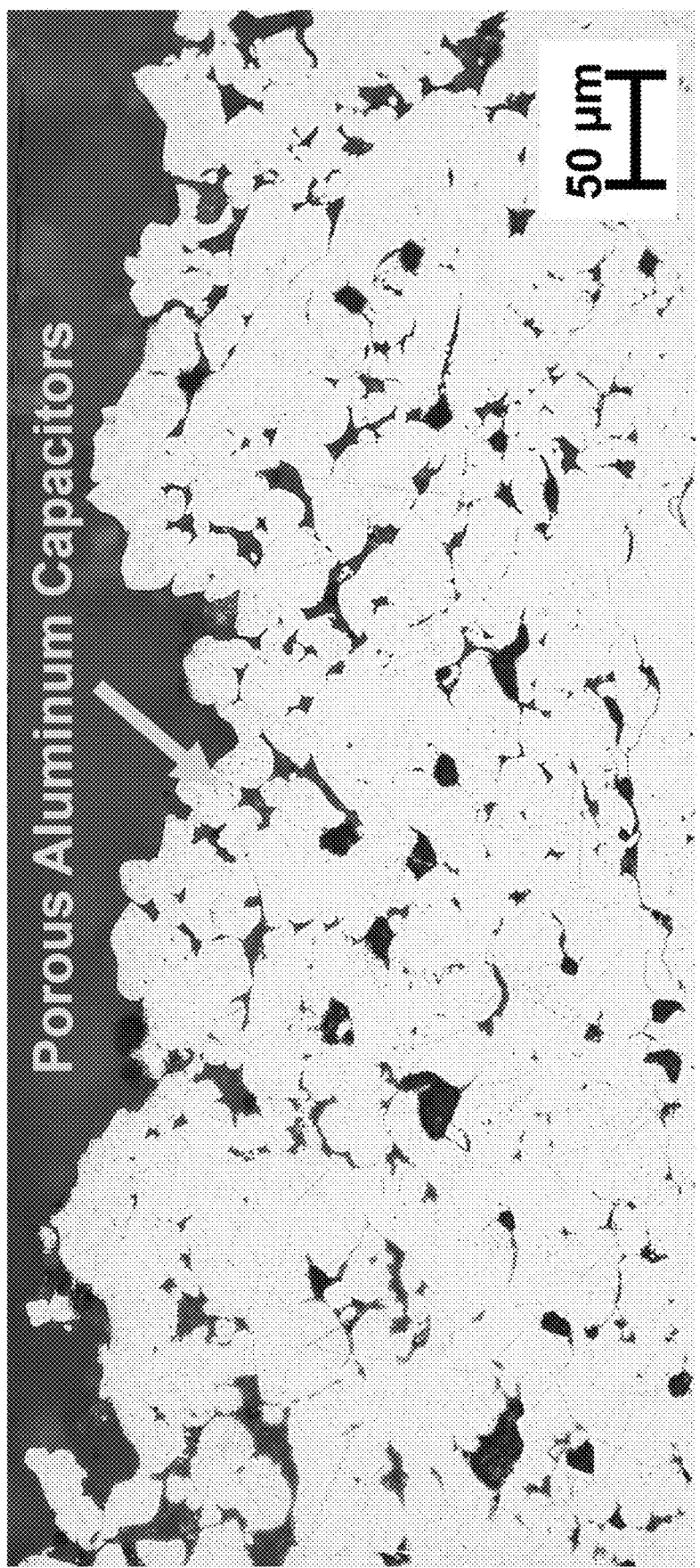
Figure 3C:
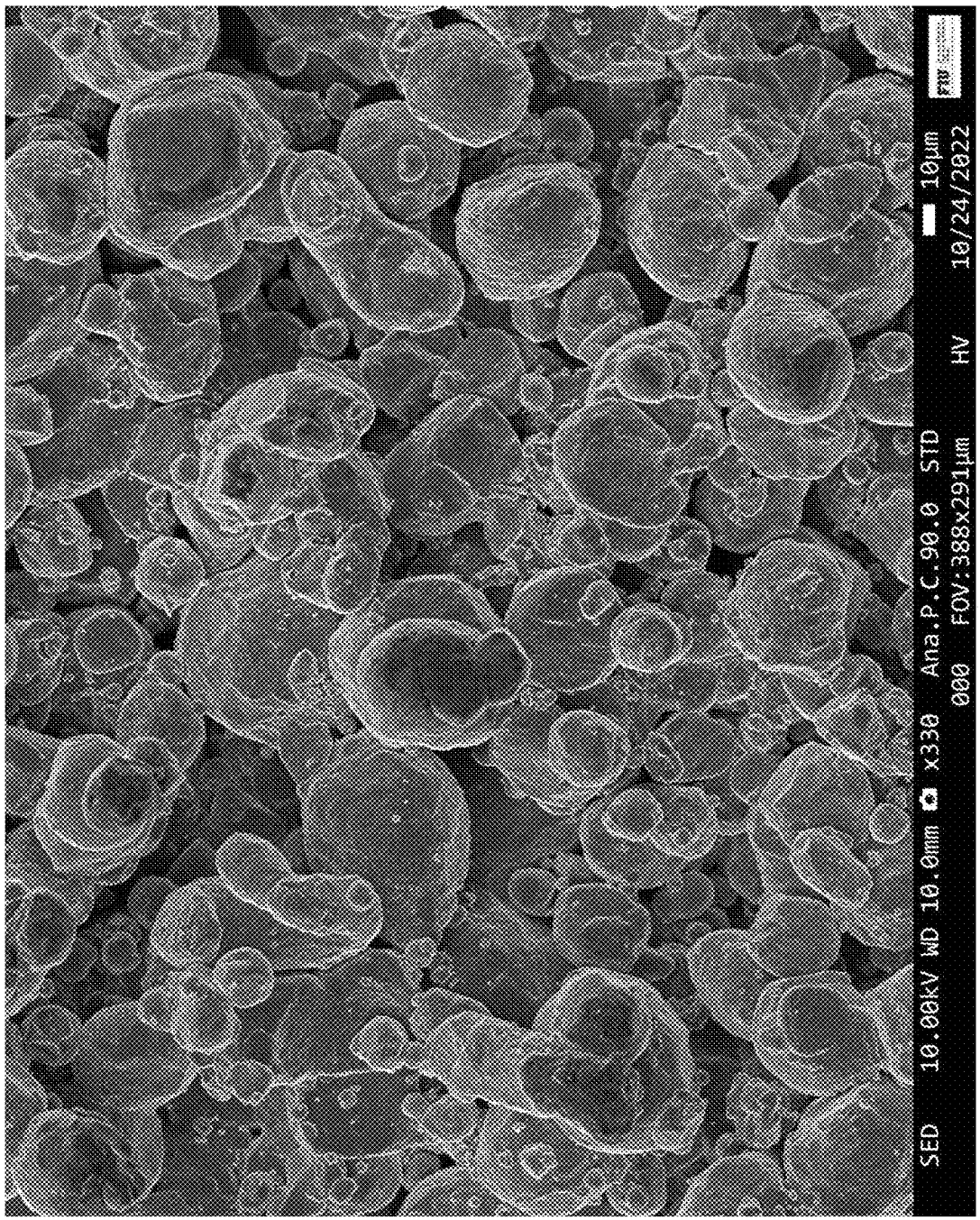

Optical micrographs of the cross section of the cold spray deposited aluminum porous capacitors are presented in FIGS. 3A-3C. A continuous distribution of porosity was achieved in the cold spray deposited aluminum by the present deposition conditions according to an embodiment of the subject invention. A lower temperature of 350° C. (compared to the critical velocity of aluminum) is used to prevent or inhibit the plastic deformation of the particle and enhance the porosity. A first prototype set of capacitor measurements were performed with liquid electrolytes to estimate the surface area enhancement. For these measurements a 5% sulfuric acid was used as an electrolyte to obtain the capacitance. The obtained capacitance-density was 49 nF/mm$^2$. Compared to the planar value of 2.2 nF/mm$^2$, this indicates an area enhancement of 22×. For higher voltages and stability, initial results showed 9.03× enhancement. The values can be further enhanced with more design and process development as desired.

The next step is to form the solid-state capacitor device terminations. In certain embodiments this is achieved by drilling vias with ultraviolet (UV) or carbon dioxide ($CO_2$) laser. This step is followed by the counter electrode and a current collector on the top. The counter electrodes are typically conducting polymers such as poly(3,4-(PEDOT: PSS), regioregular poly(3-ethylenedioxythiophene): poly (styrenesulfonate) hexylthiophene-2,5-diyl) (P3HT) and others that are also deposited by dip-coating. This process was performed as follows. The cold-sprayed aluminum substrates were dip-coated with PEDOT-PSS suspensions and baked. The blanket PEDOT-PSS films need to be subtractively etched in order to discretize the capacitors into individual units. This was achieved with a short subtractive plasma etching process with $SF_6/O_2$ gases. The conducting polymers can be etched in less than 2 minutes with this process using 150 W plasma power in a 6-inch chamber.

The next step is to form the device terminations on one side. This needs vias to connect the bottom side terminations to the top. In certain embodiments this can be achieved by drilling vias with UV or $CO_2$ laser and filling them with conductive materials. In alternative embodiments vias can be provided by other means known in the art, such as masking, etching, or forming without drilling. Standard commercial silver or copper pastes are utilized for this process and cured. The cathode contacts are also printed in this process to create the terminations. If discrete devices are fabricated by dicing the components, there is a simpler alternative to make connections without needing the vias. In this case, edge connections can be used to access the bottom. Therefore, vias are not needed. Edge connections are formed by printing silver traces at the edges or using wire bonding connections.

Silver composites were used to form the current collectors in the initial samples. With the drop-cast cathodes and silver current collector, the capacitors showed a capacitance-density of 20 $nF/mm^2$, 9× enhancement compared to planar capacitors, indicating the area enhancement with the cold-spray process. This is depicted in FIG. 4. The solid-state capacitors showed a smaller area enhancement compared to the measurements from liquid cathodes as expected from the inferior area coverage of these devices. Further enhancement is feasible both from advances in the conformal deposition of dielectric materials on high surface area porous electrodes in small form-factors, reduction in ESR (Equivalent Series Resistance) with metallic counter electrodes, low thermal resistance, thermal stability, and high breakdown strength, and also by reducing the overall capacitance need by migrating to higher switching frequencies with wide bandgap semiconductors. While not being bound by theory, with this initial proof-of-concept embodiment of the innovative high-capacitance-density capacitor technology, the inventors hypothesize that embodiments can provide 10× higher capacitance-density than related art high-voltage capacitors, high-temperature stability, high ripple current handling, and through-via capability for 3D integration with switches and controllers on either side. Embodiments can replace the large DC link and other filter capacitors in today's power modules with thin planar components that can be 3D integrated to reduce the overall weight and power of electronics.

Turning now to the figures, FIGS. 1A-1D are schematic illustrations of cold-sprayed valve metals on lead-frame according to an embodiment of the subject invention. Substrate 110 can comprise a lead frame and/or busbar formed of metal, such as copper, onto which the cold-sprayed metal 120 (e.g., Ta, Al) is added forming porous portions 121 of cold-sprayed metal on top of nonporous portions 122 of cold-sprayed metal. Build-up structure 130 can include dielectric material (e.g., polynorbornene, polyimide, polyether ether ketone, epoxy, and the like) forming dams around and/or embedding the cold-sprayed metal 120 that are selectively opened with drilled vias 160 (e.g., created with UV or $CO_2$ laser.) Anodization or dip-coating of conductive polymers deposits counter electrodes 150 over cold-sprayed metal 120 (e.g., to form cathode contacts.) Printed terminations 141-146 (e.g., printed silver or copper paste) provide lead frame and/or routing to other system components from the substrate 110, the cold-sprayed metal 120, the anodized or dip-coated counter electrodes 150, and/or the vias 160. After the formation of the device layers described above, in certain embodiments the structure can be advantageously encapsulated with a reliable high-temperature insulating materials such as silicones, polyimides or epoxies to provide a functional and reliable monolithic structure with high capacitance-density.

Elements of this embodiment are indicated as follows: 110—substrate (metal, such as aluminum or copper); 120—cold-sprayed metal (e.g., Al); 121—porous portion of cold-sprayed metal; 122—nonporous portion of cold-sprayed metal; 130—build-up structure e.g., polyimide, epoxy, polynorbornene, poly ether ketone, silicone, polyurethane); 141—146—lead frame (metal, such as aluminum or copper); 141, 144: Electrode termination 1 (e.g., copper, aluminum); 142, 143: Electrode termination 2 (e.g., copper, aluminum); 145, 146: vertical interconnect access for bottom-side terminations; 150—top electrode materials can include conducting polymers (e.g., polythiophene, polyaniline, polypyrrole) or low-melting point metals (e.g., gallium alloys, indium alloys, tin alloys); and 160—drilled vias FIGS. 2A-2C illustrate a cold-sprayed aluminum process study comparing inter-splat porosity achieved according to an air-sprayed embodiment of the subject invention against that achieved by a related art helium sprayed process. Embodiments of the subject invention (e.g., air cold-sprayed) provide a higher inter-splat porosity percentage (as shown in FIG. 2C) both before and after heat treatment compared to the material (as shown in FIG. 2B) produced by related art processes such as the reduced-oxide helium spray with in-situ splat sintering and elevated temperature (as shown in FIG. 2A.)

FIGS. 3A-3C illustrate surface morphology of cold-sprayed porous aluminum according to an embodiment of the subject invention, including (3A) cross section optical microstructure of the porous aluminum, (3B) high magnification view of the cross section optical microstructure, and (3C) SEM micrograph of top section of the cold sprayed aluminum. The porous aluminum capacitors are visible atop a dense substrate in FIG. 3A. The scale bar indicates 200 µm. A higher magnification of a section of porous aluminum capacitors are visible in FIG. 3B. The scale bar indicates 50 µm. An SEM micrograph of a section of porous aluminum capacitors are visible in FIG. 3C. The scale bar is 10 µm.

FIG. 4 is a chart showing capacitance increase and surface area enhancement with cold-sprayed aluminum according to an embodiment of the subject invention, benchmarked as a percentage relative to planar devices.

FIG. 5 is a schematic illustration of a low pressure cold-spray deposition process according to an embodiment of the subject invention. A compressor provides low pressure air through a gas regulating valve into a gas heater. The heated air is fed into a prechamber before mixing in the supersonic nozzle with aluminum powder fed from a powder feeder through a powder regulating valve into the nozzle. The cold sprayed aluminum is directed from the nozzle onto a substrate to form capacitors.

Cold-spraying of patterned valve metals according to certain embodiments of the subject invention can achieve integrated high-capacitance-density capacitors with planar architectures. Direct patterning through 3D printing technologies such as cold-spraying is one key attribute of certain embodiments. Through direct patterning, the need for post-etching processing is eliminated. The planar structure allows easy integration of thermal management and other encapsulation for enhanced reliability. Key to achieving this is to realize high surface area with porous electrodes, conformal dielectrics, and counter electrodes. Compared to multilayered electrodes that only provide linear scaling in density with thickness, porous electrodes provide nonlinear increment in surface area or capacitance-density. Reliable high surface area electrodes can be achieved with etched aluminum foil or sintered tantalum electrodes, both of which have process limitations in power module integration. Embodiments address this key barrier with cold-sprayed aluminum particles, followed by anodization. Valve metal electrodes were developed through an in-house cold-spray process. Embodiments provide several advantages such as eliminating the need for post-patterning the high surface area electrodes and allowing direct integration of the aluminum electrodes on copper or aluminum lead frames, bus bars, and heat-spreaders. Most importantly, certain embodiments eliminate the sintering issues of electrodes. Sintering refractory metals requires temperatures that typically exceed 1500° C. under high-vacuum conditions. Similarly, aluminum electrodes are created as electrochemically etched foils, which also limits their process integration. Cold-spray according to embodiments of the subject invention allows to selectively deposit the porous aluminum in a direct-patterned format without the need for post-patterning.

Achieving controlled open-porosity for high surface area electrodes can be challenging, as dense pore-free aluminum deposits are typically obtained using related art cold-spray process. Embodiments provide careful selection and control of multiple parameters including gas type, gas pressure, gas temperature, and particle velocity. The splat dynamics are controlled through mechanical deformation, interlocking, and solid-state diffusion to provide adequate metallurgical bonding between the particles. A schematic illustration of the process is shown in FIG. 5. In certain embodiments, uniformly distributed controlled porosity is achieved by selecting air as the carrier gas, lowering its temperature and thereby lowering the aluminum powder velocity as well as slightly increasing the powder feed during cold spray deposition. The powder feed consists of pure Aluminum (e.g., Al 1100) and a high strength aluminum alloy (e.g., Al 6061), in the ratio 1:1. The use of Al 1100 restricts the rate of plastic deformation thus leading to unique uniformly distributed pore formation during the cold spray process. A commercial cold spray tool (Cold Spray System CSM 108.2, Dymet, Tallinn, Estonia) was used at speed of <1 Mach to achieve the porous aluminum structures.

As illustrated in FIGS. 3A-3C, the cold-sprayed aluminum process embodiment above resulted in coarser aluminum particles that make them suitable for high voltage applications (e.g., 48-200 V or higher.) With the architectures provided in certain embodiments, the area enhancement can be estimated through simple geometric approximations. For the deposited thickness of 175 microns, the area enhancement can be calculated as:

$$AE = \frac{\text{Electrode Volume} \times \text{PF} \times \text{Particle SA}}{\text{Particle Volume}}$$

where PF=Packaging Fraction, SA=Surface Area
With spherical particles, this equation simplifies to $$AE = \frac{3}{r} \times PF \times \text{Thickness}$$

where particle radius and thickness have the same units.

The estimated area enhancement for an average particle radius of 5 microns and a packing fraction of 75% is 79×. Therefore, for the cold-sprayed architectures of certain embodiments, the expected capacitance-density of a related art planar film (e.g., 3 $nF/mm^2$) can be improved to 236 $nF/mm^2$ according to embodiments of the subject invention.

For material characterization, the morphology of the cold sprayed aluminum according to an embodiment of the subject invention is observed using optical and SEM (Jeol SEM FS100, Dearborn Road Peabody, MA 01960, USA) imaging. The images can be seen in FIGS. 3A-3C. A continuous distribution of porosity is achieved in the deposited aluminum by cold spray process according to an embodiment of the subject invention.

In certain embodiments the provided cold sprayed aluminum is anodized in standard electrolytes such as phosphoric acid, sulfuric acid, ammonium pentaborate, polyethylene glycol, citric acid, or similar electrolytes known in the art using platinized cathodes (e.g., ~ 6× anode area) at 20 V to 30 V. The initial ramp rate is 1V/minute, and the final dwell time is 35 minutes. The surfaces of the electrodes are cleaned prior to anodization using 5% sulfuric acid and 0.01 M sodium hydroxide at room temperature.

For solid state characterization the anodized aluminum capacitors are thereafter coated in conducting polymer solutions, and cured at 100° C. for 10 minutes. This is followed by a thin layer of the current collector (silver paste) deposition. The capacitance-density and surface area enhancement is estimated.

The electrochemical characterization is carried in a solution of 0.5 M potassium sulphate using an LCR meter (Agilent E4980 Precision LCR Meter, 1400 Fountaingrove Pkwy-Santa Rosa, CA 95403-6493, USA) in a two-electrode configuration. The capacitance density is estimated using a bias of 100 mV and at various frequencies starting at 20 Hz up to 20 kHz.

When ranges are used herein, combinations and subcombinations of ranges (e.g., subranges within the disclosed range) and specific embodiments therein are intended to be explicitly included. When the term "about" is used herein, in conjunction with a numerical value, it is understood that the value can be in a range of 95% of the value to 105% of the value, i.e., the value can be +/−5% of the stated value. For example, "about 1 foot" means from 0.95 foot to 1.05 foot.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A patterned high-capacitance-density valve metal device comprising:
   a metal substrate;
   a nonporous portion of cold-sprayed metal provided on the metal substrate;
   a porous portion of cold-sprayed metal provided on the nonporous portion of cold-sprayed metal;
   a build-up structure disposed on the metal substrate and around the porous portion of cold-sprayed metal; and
   a metal lead frame, the metal lead frame comprising:
  a first vertical interconnect disposed through a first via within the build-up structure;
  a second vertical interconnect disposed through a second via within the build-up structure;
  a first electrode termination disposed directly on and in physical contact with the first vertical interconnect;
  a second electrode termination disposed directly on and in physical contact with the second vertical interconnect, the second electrode termination being physically spaced apart from the first electrode termination;
  a third electrode termination disposed on the porous portion of cold-sprayed metal and physically spaced apart from the first electrode termination and the second electrode termination; and
  a fourth electrode termination disposed on the porous portion of cold-sprayed metal and physically spaced apart from the first electrode termination, the second electrode termination, and the third electrode termination,
  the first vertical interconnect, the second vertical interconnect, the first electrode termination, the second electrode termination, the third electrode termination, and the fourth electrode termination all comprising metal,
  wherein the build-up structure comprising a dielectric material, and
  the build-up structure having an upper surface that is higher than an upper surface of the porous portion of cold-sprayed metal, such that a shortest distance between an upper surface of the metal substrate and the upper surface of the build-up structure is greater than a shortest distance between the upper surface of the metal substrate and the upper surface of the porous portion of cold-sprayed metal.

2. The patterned high-capacitance-density valve metal device according to claim 1, the porous portion of cold-sprayed metal having a capacitance-density equal to or greater than 10 µf/cc at 400 V and/or equal to or greater than 500 µf/cc at 48 V.

3. The patterned high-capacitance-density valve metal device according to claim 2, further comprising an electrode provided on the porous portion of cold-sprayed metal, the electrode being disposed under the third electrode termination and the fourth electrode termination.

4. The patterned high-capacitance-density valve metal device according to claim 3, further comprising an encapsulating high-temperature insulating layer provided on or around the metal substrate, the non-porous portion of cold-sprayed metal, the porous portion of cold-sprayed metal, the electrode the first vertical interconnect, the second vertical interconnect, the first electrode termination, the second electrode termination, the third electrode termination, and the fourth electrode termination.

5. The patterned high-capacitance-density valve metal device according to claim 1, both the nonporous portion of cold-sprayed metal and the porous portion of cold-sprayed metal comprising one or more valve metals.

6. The patterned high-capacitance-density valve metal device according to claim 5, the one or more valve metals comprising at least one of aluminum, titanium, tantalum, niobium, tungsten, chromium, zirconium, hafnium, zinc, vanadium, bismuth, and antimony.

7. The patterned high-capacitance-density valve metal device according to claim 4,
  the metal substrate comprising copper or aluminum,
  the nonporous portion of cold-sprayed metal comprising aluminum or tantalum,
  the porous portion of cold-sprayed metal comprising aluminum or tantalum,
  the dielectric material comprising polynorbornene, polyimide, polyether ether ketone, or epoxy,
  the electrode being an anodized metal or dip-coated conductive polymer electrode, and
  the first electrode termination, the second electrode termination, the third electrode termination, and the fourth electrode termination comprising printed silver or copper paste.

8. The patterned high-capacitance-density valve metal device according to claim 4, the encapsulating high-temperature insulating layer comprising a silicone, a polyimide, or an epoxy to provide a functional and reliable monolithic structure with high capacitance-density.

9. A patterned high-capacitance-density valve metal device comprising:
  a metal substrate;
  a nonporous portion of cold-sprayed metal provided on the metal substrate;
  a porous portion of cold-sprayed metal provided on the nonporous portion of cold-sprayed metal having a capacitance-density equal to or greater than 10 µf/cc at 400 V and/or equal to or greater than 500 µf/cc at 48 V;
  an anodized or dip-coated electrode provided on the porous portion of cold-sprayed metal;
  a build-up structure disposed on the metal substrate and around the porous portion of cold-sprayed metal; and
  a metal lead frame,
  the metal lead frame comprising:
    a first vertical interconnect disposed through a first via within the build-up structure;
    a second vertical interconnect disposed through a second via within the build-up structure;
    a first electrode termination disposed directly on and in physical contact with the first vertical interconnect;
    a second electrode termination disposed directly on and in physical contact with the second vertical interconnect, the second electrode termination being physically spaced apart from the first electrode termination;
    a third electrode termination disposed on the porous portion of cold-sprayed metal and physically spaced apart from the first electrode termination and the second electrode termination; and
    a fourth electrode termination disposed on the porous portion of cold-sprayed metal and physically spaced apart from the first electrode termination, the second electrode termination, and the third electrode termination,
  the first vertical interconnect, the second vertical interconnect, the first electrode termination, the second electrode termination, the third electrode termination, and the fourth electrode termination all comprising metal,
  the patterned high-capacitance-density valve metal device further comprising an encapsulating high-temperature insulating layer provided on or around the metal substrate, the non-porous portion of cold-sprayed metal, the porous portion of cold-sprayed metal, the electrode, the first vertical interconnect, the second vertical interconnect, the first electrode termination, the second electrode termination, the third electrode termination, and the fourth electrode termination, wherein the build-up structure comprising a dielectric material, and the build-up structure having an upper surface that is higher than an upper surface of the porous portion of cold-sprayed metal, such that a shortest distance between an upper surface of the metal substrate and the upper surface of the build-up structure is greater than a shortest distance between the upper surface of the metal substrate and the upper surface of the porous portion of cold-sprayed metal.

10. The patterned high-capacitance-density valve metal device according to claim 9, the metal substrate comprising copper or aluminum, the nonporous portion of cold-sprayed metal comprising aluminum or tantalum, the porous portion of cold-sprayed metal comprising aluminum or tantalum, the dielectric material comprising polynorbornene, polyimide, polyether ether ketone, or epoxy;

the first electrode termination, the second electrode termination, the third electrode termination, and the fourth electrode termination comprising printed silver or copper paste, and the encapsulating high-temperature insulating layer comprising a silicone, a polyimide, or an epoxy to provide a functional and reliable monolithic structure with high capacitance-density.

\* \* \* \* \*